United States Patent
Goujon et al.

[11] Patent Number: 6,122,374
[45] Date of Patent: Sep. 19, 2000

[54] METHOD OF READING A SERVICE CARD

[75] Inventors: Patrick Goujon, Suresnes; Jacques Le Berre, Paris; Issa Rakhodai, Montigny le Bretonneux, all of France

[73] Assignee: U.S. Philips Corporation, New York, N.Y.

[21] Appl. No.: 08/862,209

[22] Filed: May 22, 1997

[30] Foreign Application Priority Data

May 22, 1996 [FR] France .................................. 96 06357

[51] Int. Cl.[7] .................................................. H04N 7/167
[52] U.S. Cl. ................................. 380/10; 380/4; 348/460
[58] Field of Search .......................... 380/16, 10; 455/6.2; 348/5.5, 10

[56] References Cited

U.S. PATENT DOCUMENTS 5,414,773  5/1995  Handelman ............................... 380/49
5,774,546  6/1998  Handelman et al. ....................... 380/4
5,805,230  9/1998  Staron ..................................... 348/460

FOREIGN PATENT DOCUMENTS 9307717  4/1993  WIPO .............................. H04N 7/16

*Primary Examiner*—Gail O. Hays
*Assistant Examiner*—Miles Horak
*Attorney, Agent, or Firm*—Michael E Belk

[57] ABSTRACT

In a video-communication receiver provided with a deciphering module (13) used for the descrambling of scrambled transmissions, using a memory card (17) for providing information required for descrambling, service information is introduced into the receiver, for example, by replacing the memory card by a service card containing the information in a ciphered form. The receiver is provided with apparatus (29, 12, 31) for deciphering ciphered service information by means of its own deciphering module (13).

17 Claims, 1 Drawing Sheet

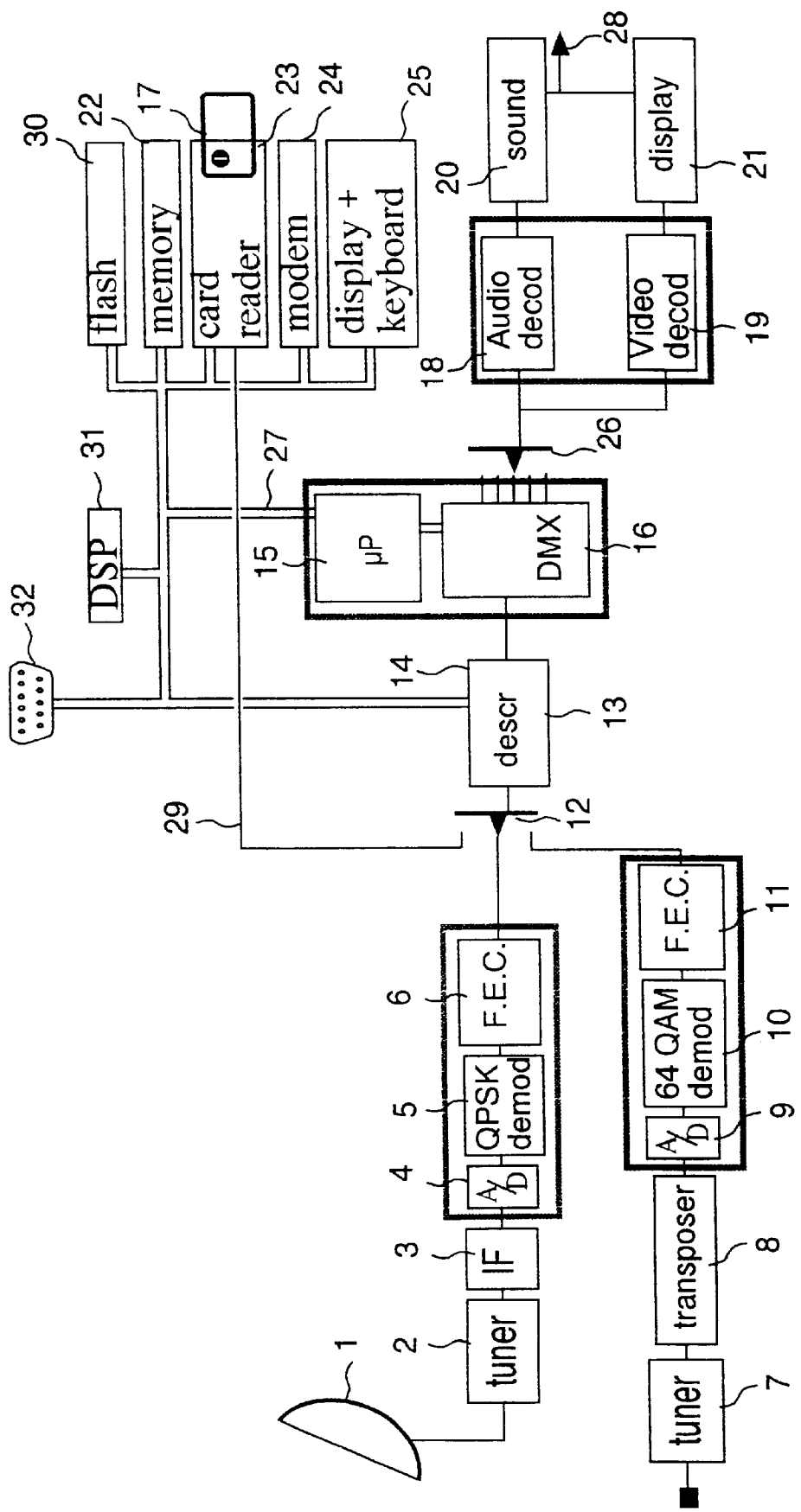

METHOD OF READING A SERVICE CARD

BACKGROUND OF THE INVENTION

1. Field of the Invention

This invention relates to a method of reading service information in a video-communication receiver provided with means for receiving and deciphering ciphered signals transmitted to the receiver by a television transmitter, said means particularly comprising a microprocessor associated with a random-access memory and a read-only memory containing instructions, and a deciphering module for deciphering said ciphered signals, in which method ciphered information is introduced into the receiver in a service mode.

The invention also relates to a video-communication receiver comprising means for receiving and deciphering ciphered signals transmitted to the receiver by a television transmitter, and which may include e-mail and facsimile messages, etc., said means particularly comprising a microprocessor associated with a random-access memory and a read-only memory containing instructions, and a deciphering module for deciphering said ciphered signals.

The invention also relates to a microprocessor card intended for a receiver according to the invention.

2. Description of the Related Art

A television system in which the pictures are descrambled is known from Patent Application WO 93/07715 (Thomson). In accordance with this document, a specific microprocessor card is used by an installer for automatically updating the television channels in a receiver in accordance with the reception range.

Such an update of a receiver may concern the reception frequencies, but also data authenticating the user's subscription. It is therefore useful that the servicing information, or at least certain information, is ciphered to secure it from abuse. In principle, it is thus necessary to use a deciphering module which supplies deciphered data via ciphered service information on the basis of a secret code and/or deciphering instructions applied thereto. The deciphering instructions themselves may also be ciphered.

SUMMARY OF THE INVENTION

It is an object of the invention to simplify the realization of a system capable of receiving and deciphering such servicing information.

To this end, the deciphering module of the receiver itself is used for deciphering said information, i.e. a receiver is provided with means for deciphering the service information by means of its own deciphering module.

A specific deciphering module will thus be superfluous.

In a particular embodiment, ciphered servicing information is loaded into a random-access memory of the receiver and is subsequently formed by the microprocessor before being treated by the deciphering module of the receiver, i.e. a receiver is provided with means for loading ciphered service information in the random-access memory and for giving said information a form which simulates signals transmitted to the receiver by a transmitter before treating this information by means of its own deciphering module.

In another embodiment, the ciphered information is conveyed by a data stream which simulates signals transmitted to the receiver by a television transmitter, i.e. this flux is organized in packets of the same format as that of said signals.

The information may thus be transmitted directly to the deciphering module of the receiver.

As an alternative, a microprocessor service card carried by a servicing technician is placed in a card reader of the receiver and is used as a support for the information introduced into the receiver, i.e. a receiver, equipped with a microprocessor card reader, is provided with means for reading a service card placed in said reader.

In accordance with another alternative, a connector provided on the receiver for connection with the outside is used for introducing information into the receiver, i.e. said receiver is provided with means for receiving ciphered servicing information via this connector.

A service card advantageously produces a ciphered data stream which simulates signals transmitted to the receiver by a transmitter, i.e. it is organized in packets of the same format as that of said signals.

These and other aspects of the invention will be apparent from and elucidated with reference to the embodiments described hereinafter.

BRIEF DESCRIPTION OF THE DRAWING

In the drawing:

The sole FIGURE shows diagrammatically a video-communication receiver provided with a microprocessor card reader.

DESCRIPTION OF THE PREFERRED EMBODIMENTS

The video-communication receiver shown in the FIGURE comprises a satellite receiver assembly 1-6 and a cable receiver assembly 7-11.

The satellite receiver assembly is constituted by a parabolic antenna 1 and a tuner 2, followed by an IF amplifier 3. At this level, the signal is modulated in accordance with a known process referred to as QPSK. The IF signal is converted into digital values in an A/D converter 4 and is then demodulated by the demodulator 5 of the QPSK type. Finally, certain errors in the signal are corrected in a Forward Error Correction (F.E.C.) device 6, based on the fact that the signal comprises redundancy bits in accordance with a known coding principle.

The cable receiver assembly is constituted, from a signal input, by a tuner 7 followed by a transposer 8. At this level, the signal is modulated in accordance with a known process referred to as 64 QAM. The IF signal is converted into digital values in an A/D converter 9 and then demodulated by the demodulator 10 of the 64 QAM type. Finally, certain errors in the signal are corrected by means of an error corrector 11 of the same type as the corrector 6.

At this level, the demodulated signal is referred to as MPEG-2 TS (for "MPEG-2 Transport Stream"): it is a signal which has a capacity of approximately 36 megabits and comprises up to twenty programs with sound and data which, as the case may be, are scrambled.

A satellite receiver assembly and a cable receiver assembly are shown here in combination, although they are also often realized in two separate apparatuses. A switch 12 allows the choice of either the satellite signal or the cable signal. The signal is then descrambled in a descrambling module 13 connected by a bus 27 to a reader 23 for a microprocessor card 17, referred to as a chip card, and to a microprocessor 15.

The microprocessor 15 comprises a read-only memory in which the basic instructions are written. It is associated with a random-access memory 22 for instantaneous data, to a flash memory 30 for memorizing elements of the programs which may have to be updated, and with a card reader 23, a control keyboard and/or a telecontrol receiver, a display screen 25 for the data, and possibly a modem 24.

The descrambled signal is subsequently submitted to the action of a demultiplexer 16 connected to the microprocessor 15, which demultiplexer separates the different programs of the MPEG-2 TS signal one from the other, one of which is selected by means of a switch 26. The signal from this demultiplexer is still in a digital form and needs to be transformed into an analog signal for displaying a picture on a screen and for applying the sound to a loudspeaker. This final transformation is effected in a video decoder 19 which supplies a signal of known type, for example of the 4-2-2 type in the YUV form, and in an audio decoder 18. In this embodiment, these decoders are followed by audio and video post-processing circuits 20 and 21, respectively, connected by means of a connection 28 to standard audio and video circuits of the receiver, if a television receiver is concerned, or of an exterior television receiver, if the receiver described is a decoder unit intended to be connected to a signal input of a conventional television receiver of the PAL, SECAM or NTSC type.

The reader 23 for the chip card 17 is used for reading information required for descrambling television pictures in a known manner. It is also used for introducing service information in the receiver, particularly software. For this purpose, the user card comprising personal information such as a distribution key, features of the subscription to pay-TV service, etc. is replaced in the same reader by a service card comprising updating information, for example, software elements, in a ciphered form. It is clear that this information may alternatively be introduced into the receiver by means of a connector 32, for example, of a type standardized as IEEE 1284. For introducing information, this connector may be connected to a microcomputer of the type known as "PC" (personal computer), or to an apparatus which is specially designed for controlling receivers, or to a connection, for example of the type RS232, with a central unit for loading data.

To decipher the service information, the descrambling module 13 of the receiver itself is used. Different means may be used for this purpose:

the information on the card may be directly applied to the descrambling module 13 by means of a connection 29 provided for this purpose between the card reader 23 and the switch 12, which selects the connection 29 so as to connect it to the module 13. The microprocessor card then produces a data stream which simulates signals transmitted to the receiver by a transmitter, i.e. it is organized in packets of the same format as the MPEG-2 TS signal. Adapted software, which those skilled in the art can write on request, is loaded into a microprocessor memory so that the information from the module 13 is recognized as an update of the software and is used suitably.

The information may also be transferred in a ciphered form directly to the memory 22 from the reader 23 or the connector 32 and may subsequently be given the form of packets of the same format of the MPEG-2 TS signal by the microprocessor 15 itself and then applied to the module 13. In this case, it is not necessary that the microprocessor card produces a data stream simulating signals transmitted to the receiver by a transmitter.

The information in the card may be organized in layers: a first layer contains the control word required for deciphering; this control word itself may have a ciphered form. A key supplied by the installer allows deciphering of the control word with which the other information constituting a second layer is deciphered. The first layer may also contain several other informations about the contents of the second layer and about the manner to decipher said second layer. It is always possible to decipher the service information in certain cases by means of deciphering instructions which are directly supplied with the information of the first layer, i.e. which do not use the deciphering module of the receiver: this is then also indicated in the first layer. This may depend, for example, on a choice made by the television broadcaster involved in the supply of service information.

The mode of operation of the assembly is thus as follows (it is supposed that the transfer is realized by means of a microprocessor card): the installer places the card in the receiver, the latter recognizes a service card (in known manner) and then reads the first packet in the card, subsequently has a dialogue with the installer in order to obtain from him the key for deciphering this first packet; it may also have a signature on the card with which the validity of the key supplied by the installer can be recognized without knowing it in advance; different ciphering methods of this type are known per se. In the case where the invention is put into effect, the data thus obtained are transmitted to the module 13 allowing it to decode the rest of the packets contained in a ciphered form in the card 17 (second layer). As a variant, an autonomous microcontroller 31 may also be charged with operations of reading and interpreting the information of the first layer. If the information of the first layer indicates that the information of the second layer is in a form intended to be treated by the descrambling module of the receiver, the autonomous microcontroller 31 then switches the control to the principal microprocessor 15 which will decipher the rest of the information, i.e. the second layer.

We claim:

1. A method of reading servicing information in a video-communication receiver provided with means for receiving and deciphering ciphered signals transmitted to the receiver by a television transmitter, said means comprising a microprocessor associated with a random-access memory and a read-only memory containing instructions, and a deciphering module for deciphering said ciphered signals, the method comprising: introducing ciphered servicing information from a servicing apparatus into the receiver in a servicing mode, and using the deciphering module of the receiver itself for deciphering said servicing information.

2. A method as claimed in claim 1, further comprising; loading ciphered servicing information into a random-access memory of the receiver and which is subsequently formed by the microprocessor before processing by the deciphering module of the receiver.

3. A method as claimed in claim 1, which comprises; conveying the ciphered servicing information by a data stream which simulates signals transmitted to the receiver by a television transmitter, said data stream being organized in packets of the same format as that of said signals.

4. A method as claimed in claim 3, further comprising; placing a microprocessor servicing card in a card reader of the receiver which card carries the servicing information introduced into the receiver.

5. A method as claimed in claim 1, further comprising; placing a microprocessor servicing card in a card reader of the receiver which card carries the servicing information introduced into the receiver.

6. A method as claimed in claim 1, which comprises; using a connector provided on the receiver for connection with the exterior for introducing the servicing information into said receiver.

7. A video-communication receiver comprising: means for receiving and deciphering ciphered signals transmitted to the receiver by a television transmitter, said means comprising a microprocessor associated with a random-access memory and a read-only memory containing instructions, and a deciphering module for deciphering said ciphered signals, means for introducing ciphered servicing information from servicing apparatus into the receiver, and said receiver includes means for deciphering the servicing information by means of said deciphering module.

8. A video-communication receiver as claimed in claim 7, further comprising: means for loading ciphered servicing information from a servicing apparatus into the random-access memory and for giving said information a form which simulates signals transmitted to the receiver by a transmitter before processing the simulated signals by means said deciphering module.

9. A video-communication receiver as claimed in claim 8, further comprising a microprocessor card reader, and means for reading a servicing card placed in said card reader.

10. A video-communication receiver as claimed in claim 8, comprising a connector for connection with the exterior, wherein said receiver includes means for receiving ciphered servicing information via said connector.

11. A video-communication receiver as claimed in claim 7, further comprising a microprocessor card reader, and means for reading a servicing card placed in said card reader.

12. A video-communication receiver as claimed in claim 11, wherein said servicing card carries servicing information in a ciphered form which is read by the card reader and stored in said random access memory.

13. A video-communication receiver as claimed in claim 11, wherein said servicing card carries servicing information in a ciphered form which is read by the card reader and supplied to said deciphering module.

14. A video-communication receiver as claimed in claim 7, comprising a connector for connection with the exterior, wherein said receiver servicing information via said connector.

15. A video-communication receiver as claimed in claim 7, wherein said servicing information is introduced into the receiver via a receiver input port different from that for the signals received from the television transmitter and in a format different from that of the signals received from the television transmitter, and said receiver includes means for converting the servicing information into the same format as that of the television signals.

16. A microprocessor card, intended for a receiver as claimed in claim 7, which card produces a ciphered data stream which simulates signals transmitted to the receiver by a transmitter, said data stream being organized in packets of the same format as that of said transmitted signals.

17. A microprocessor card, intended for a receiver as claimed in claim 11, which card produces a ciphered data stream which simulates signals transmitted to the receiver by a transmitter, said data stream being organized in packets of the same format as that of said transmitted signals.

* * * * *